May 7, 1968  P. COOLEY  3,382,497
LINEAR FREQUENCY MODULATED RADAR
Filed Oct. 13, 1966  3 Sheets-Sheet 1
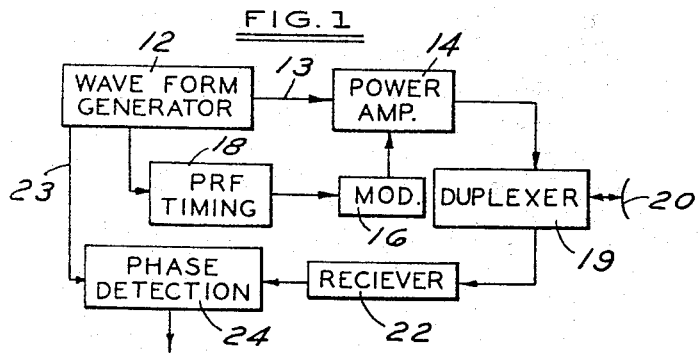
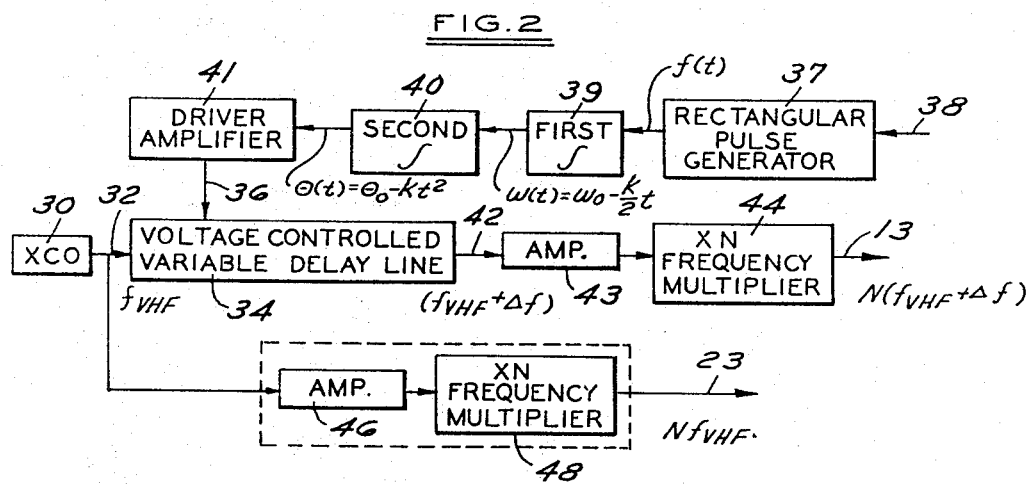
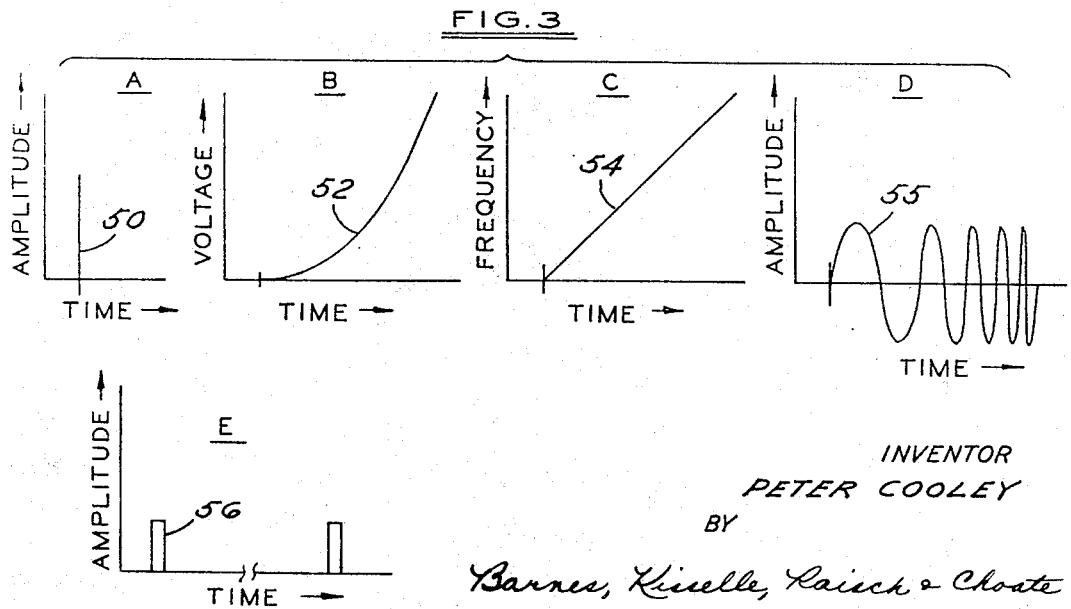
INVENTOR
PETER COOLEY
BY
Barnes, Kisselle, Raisch & Choate
ATTORNEYS

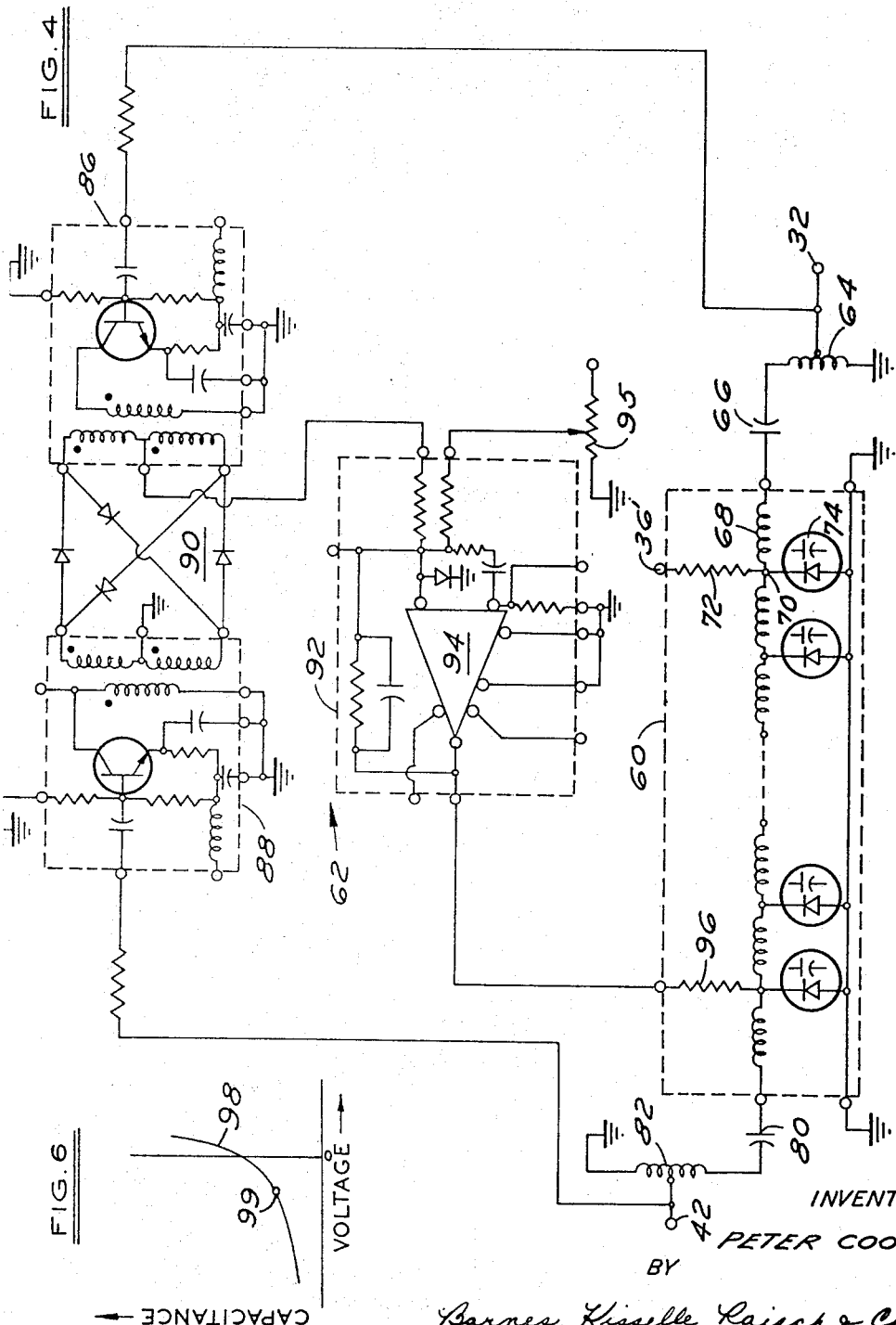

May 7, 1968  P. COOLEY  3,382,497
LINEAR FREQUENCY MODULATED RADAR
Filed Oct. 13, 1966  3 Sheets-Sheet 3
FIG. 5
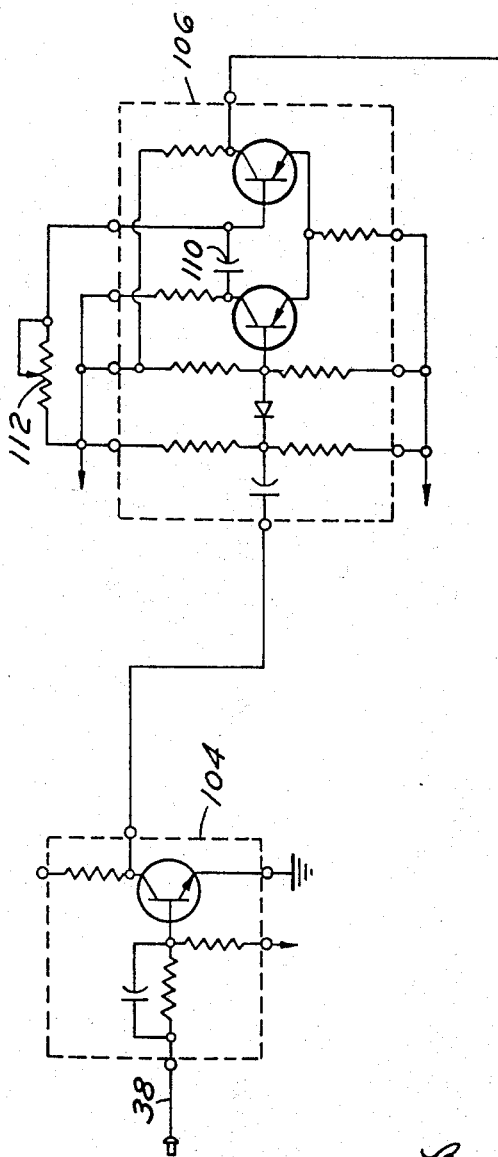
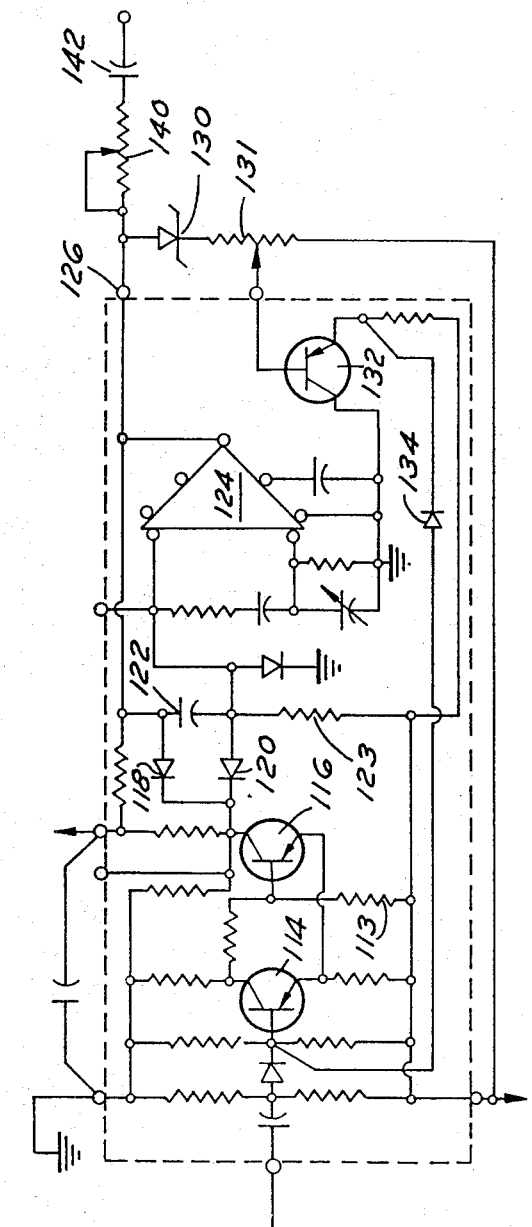
INVENTOR
*PETER COOLEY*
BY
*Barnes, Kisselle, Raisch & Choate*
ATTORNEYS United States Patent Office
3,382,497
Patented May 7, 1968

3,382,497
LINEAR FREQUENCY MODULATED RADAR
Peter Cooley, Ann Arbor, Mich., assignor to Conductron Corporation, Ann Arbor, Mich., a corporation of Delaware
Filed Oct. 13, 1966, Ser. No. 586,452
8 Claims. (Cl. 343—17.2)

ABSTRACT OF THE DISCLOSURE

A pulse type radar wherein each transmitted pulse has linear frequency modulation includes a waveform generator to linearly frequency modulate an intermediate frequency carrier at small signal levels. The frequency of the intermediate carrier is low relative to the carrier frequency of the transmitted pulses. The waveform generator comprises a voltage-controlled variable delay line having a plurality of shunt diodes. A modulating signal having a repetitive waveform that is generally parabolic over each repetition period is applied to the delay line. The modulating signal varies the capacitance of the diodes to in turn vary the effective electrical length of the line. The intermediate frequency carrier is also applied to the delay line and the waveform of the modulating signal causes linear frequency modulation of the intermediate carrier during each repetition period. The frequency modulated intermediate carrier is then frequency multiplied up to the desired frequency for the transmitted carrier. The frequency multiplication also increases the frequency deviations in the intermediate carrier introduced by the delay line. After multiplication, the carrier is periodically switched to provide transmitted pulses each of which has a linear frequency variation.

---

This invention relates to radar wherein transmitted radar pulses are linear frequency modulated and to a waveform generator for generating a linear frequency modulated signal in such radars.

High resolution radars operated by pulse compression techniques combine desirable attributes of both long pulse and short pulse radars. In one type of pulse compression radar, the transmitted pulses are of relatively long duration and each pulse is linear frequency modulated (FM) so that high energy per pulse can be obtained. Returned pulses are "compressed" as by matched-filter techniques to obtain resolution and accuracy comparable to that that could be obtained by transmitting a relatively short pulse. However, since a high energy pulse was transmitted, the detection and range capabilities of long pulse systems is retained. This system is sometimes referred to as a "chirp" radar, denoting a progressive linear frequency deviation during each transmitted pulse. Typical systems of this type are generally shown and described in United States Patent No. 2,624,876, entitleed, "Object Detection System," and issued in the name of Robert H. Dickey on Jan. 6, 1963 and United States Patent No. 2,678,997, entitled, "Pulse Transmission," and issued in the name of Sidney Darlington on May 18, 1954.

Techniques for linear frequency modulated (FM) radars used in both ground and airborne applications are not readily compatible with practical aerospace applications in view of rigid weight, power, volume, simplicity and reliability requirements. In addition to effective electrical performance, per se, other problems that are contemplated in space applications are heat transfer, operation in the hard vacuum, stability of basic materials, long life with unattended operation, incident radiation, mechanical integrity and survival during launching.

By way of illustration, in many prior art ground and airborne radars of the linear FM type, the particular waveform of the transmitted pulse is generated by direct modulation of a carrier of transmitting frequency, for example, frequencies in the C-band. The modulated carrier is then switched through a pulsed power amplifier to develop the transmitted pulses.

By way of further illustration, linear frequency modulation at carrier frequencies can be obtained by direct modulation of the active carrier generator, for example, either a backward wave oscillator or a voltage tuned magnetron. However, both of these methods are undesirable for space applications due to size, weight, power supply requirements and complex circuitry. Frequency modulation shifts at carrier frequencies can also be obtained using a traveling wave tube (Serrodyne techniques) but synchronizing the traveling wave tube to a carrier frequency source is difficult and the weight, power and volume that would be required to implement the traveling wave tube method for space application makes this method unattractive. Digital microwave phase shifting techniques might also be employed but again this technique is not believed to be satisfactory because the resulting circuitry would be large and bulky, complex logic driving circuits would be required and the technique is limited to relatively small bandwidths due to rapid switching times that would be required. Other prior techniques are subject to the same disadvantages and may require special inputs that are difficult to generate.

The objects of the present invention include providing a linear frequency modulated radar which eliminates or substantially reduces the aforementioned disadvantages associated with the aforementioned systems wherein the carrier is frequency modulated directly; that provides an effective and efficient linear modulated radar for aerospace applications and conforms to rigid weight, power supply, volume, thermal, simplicity and reliability requirements; that can provide accurate and stable waveforms required for effective linear frequency modulated radar; and that can achieve wide band frequency modulations comparable to that which can be achieved with bulkier, less efficient, prior art techniques.

Further objects of the present invention are to provide effective linear frequency modulation of transmitted carrier frequency pulses by developing accurate and stable waveforms and signal coherence at lower frequencies which can be frequency multiplied up to the required transmitted carrier frequency.

Still further objects of the present invention are to provide a waveform generator for use in a linear frequency modulated radar that provides an adequate time bandwidth product with a decrease in size and weight compared with other modulation techniques for precise, stable and accurate linear frequency modulated radar; and that is compatible with power supply, space, weight, simplicity, reliability and environmental requirements for aerospace applications.

For purposes of illustration and not by way of limitation, the present invention contemplates a linear frequency modulated radar incorporating a waveform generator wherein linear frequency modulation is obtained at small signals and at low frequencies (VHF) to generate the required chirp waveform. The low frequency chirp signal is frequency multiplied in an accurate manner to obtain the required transmitting carrier frequency (C-band) and the required frequency modulation deviations while retaining the fidelity, stability, accuracy and linearity of the original chirp waveform generated at the VHF frequency. In the preferred embodiment of the present invention, the waveform generator includes an electrically-controlled phase shifter and more particularly a voltage variable delay line to obtain the required linear FM signal. The voltage variable delay line comprises shunt diodes whose capacitance can be varied to obtain the phase shift required. Because solid state components can be used in the delay line, the entire waveform generator can utilize solid state components and this construction can meet cost, size, weight, power efficiency, reliability and environmental requirements for severe aerospace applications.

Although the preferred embodiment of the present invention is disclosed herein for use with coherent radar, it is to be understood that the invention is also applicable to non-coherent systems. For coherent radar systems, the waveform generator of the present invention, including the frequency multipliers, provides the transmitted carrier frequency signal which is switched by a power amplifier to form high energy radar pulses for subsequent transmission. The waveform generator also provides a reference signal for coherent detection of returned signals. The waveform generator output contains linear frequency modulation waveforms for the transmitted carrier frequency which is in phase with the coherent detection reference signal and the proper phase relationship between the transmitted signal and the reference signal can be retained at the initiation and cessation of each carrier frequency pulse.

Other objects, features and advantages of the present invention will become apparent in connection with the following description, the appended claims and the accompanying drawings in which:

FIG. 1 is a block diagram of a linear frequency modulated radar of the present invention;

FIG. 2 is a functional block diagram of a waveform generator in the radar illustrated in FIG. 1;

FIG. 3 illustrates various waveforms of signals developed in the circuit of FIGS. 1 and 2 and is useful to an understanding of the present invention;

FIG. 4 is a detailed circuit diagram of a voltage controlled variable delay line that serves as a frequency modulator in one specific implementation of the waveform generator functionally illustrated in FIG. 2;

FIG. 5 is a schematic diagram of a circuit for generating a modulating signal that is applied to the delay line illustrated in FIG. 4; and FIG. 6 is a curve illustrating capacitance-voltage characteristics of capacitive diodes in the delay line.

The linear frequency modulated radar system illustrated in FIG. 1 generally comprises a waveform generator 12 that develops a linear frequency modulated carrier signal that is applied (via a connection 13) to a power amplifier 14. Amplifier 14 is pulsed by a modulator 16 to gate the amplifier 14 in a conventional manner so that the repetitive signal from generator 12 is amplified and shaped to the conventional radar pulse train. Modulator 16 and generator 12 are synchronized by a suitable timing signal from a pulse repetition frequency (PRF) timing circuit 18. The pulse output developed at amplifier 14 is fed to a duplexer 19 and radiated by an antenna 20. The receiver portion of the linear FM radar system illustrated in FIG. 1 includes antenna 20, duplexer 19, a receiver 22 and a phase detection circuit 24. For a coherent system as shown in FIG. 1, generator 12 also provides a phase detection reference signal which is applied to the phase detection circuit 24 (via a connection 23). The linear frequency modulated radar system illustrated in FIG. 1 is generally similar to prior systems except for the construction and operation of the waveform generator 12. The aforementioned United States Patents 2,624,876 and 2,678,997 may be referred to in connection with the overall operation and construction of a linear frequency modulated radar and since such systems are, in general, well known and understood, they will be described in detail herein only to the extent necessary for an understanding of the present invention.

The waveform generator 12 (FIG. 1) generally comprises the circuit functionally illustrated in block form in FIG. 2. A crystal controlled oscillator 30 provides a constant amplitude, continuous wave (CW) signal having a precise and stable frequency in the VHF range. The CW signal is applied to one input 32 of a voltage controlled variable delay line 34 to be modulated in accordance with a modulating signal applied to a second input 36 of line 34. The modulating signal is developed from rectangular pulses provided by a generator 37. Timing signals from timing circuit 18 are fed to generator 37 (via connection 38) to synchronize the output of generator 37. The rectangular pulses are fed to a first integrator 39 which in turn feeds a second integrator 40. The output of integrator 40 is fed to input 36 of line 34 through a driver amplifier 41. Although the double integration of rectangular pulses to obtain the modulating signal is illustrated as performed by two separate operations (integrators 39, 40), double integration can be performed by a single functional circuit or by a single integrator together with line 34 as will later be explained.

The modulating signal at 36 has a repetitive waveform that is generally parabolic over a period initiated by generator 37 and generally corresponding to the period of each transmitted pulse. This waveform causes the effective electrical length of line 34 to vary in a prescribed manner during each transmitted pulse period and thereby modify the phase of the CW signal from oscillator 30 during each such period. The output of delay line 34 is an intermediate frequency modulated signal whose carrier frequency is determined by the frequency of the CW signal from oscillator 30 and with the frequency progressively varying, either increasing or decreasing, from the beginning of each period to the end of each period. The frequency deviations are the same during each period. The intermediate FM carrier from line 34 is fed (via a connection 42) through an amplifier 43 to a frequency multiplier 44 which increases the carrier frequency and correspondingly increases the total frequency deviation of the intermediate carrier signal. Multiplier 44 increases both frequency and total frequency deviation by a predetermined factor designated N in FIG. 2. The FM carrier signal developed by multiplier 44 is fed (via connection 13, FIGS. 1 and 2) to amplifier 14.

For the coherent radar system illustrated in FIG. 1, the CW signal from oscillator 30 is also fed through an amplifier 46 and a frequency multiplier 48 having the same multiplication factor N. The output from multiplier 48 provides a phase detection reference signal that is applied to the phase detection circuit 24 (FIG. 1) via connection 23.

The overall operation of the radar system illustrated in FIG. 1 and the waveform generator 12 (FIG. 2) may be better understood with reference to the waveforms shown in FIG. 3. A PRF timing pulse 50 (FIG. 3A) initiates a rectangular pulse generation by generator 37. The leading edge of the pulse is successively integrated by integrators 39, 40. The integration product has a parabolic or quadratic waveform 52 (FIG. 3B) over the period of the transmitted pulse. With this particular waveform applied at input 36, the CW signal from oscillator 30 is modulated by the delay line 34 so that the intermediate FM signal at the output of delay line 34 has linear frequency deviations from the VHF frequency as designated at 54 (FIG. 3C) and 55 (FIG. 3D). The output of the delay line has constant peak amplitudes and during each reoccurring pulse interval the frequency is progressively increased from the leading edge of the interval to the end of the interval as illustrated by the waveform 55 (FIG. 3D). The reoccurring linear FM output from the delay line 34 is frequency multiplied by the multiplier 44 up to the required transmitting carrier frequency and the final radar pulses are formed by switching the power amplifier 14 in accordance with signals from modulator 16. The output envelope waveform 56 (FIG. 3E) at amplifier 14 comprises a series of constant amplitude and constant duration pulses which are transmitted via duplexer 19 and antenna 20. Each of the transmitted pulses 56 is linear frequency modulated in a manner corresponding to that illustrated in FIG. 3D. The pulsing is timed by circuit 18 so that the transmitted pulse is some predetermined portion of the FM output from line 34. It will be apparent that the waveforms 54, 55 illustrated in FIGS. 3C and 3D can be considered as representing the frequency deviation either at the low frequency intermediate carrier (VHF) or at the higher transmitted carrier frequency.

In the preferred embodiment of the present invention, the waveform generator 12 was implemented with a lumped-constant, distributed inductance-capacitance transmission line 60 (FIG. 4) which corresponds to the delay line 34 (FIG. 2) with only minor modifications that allow the second integrator 40 and driver amplifier 41 (FIG. 2) to be eliminated. Also illustrated in the circuit of FIG. 4 is a phase lock circuit 62 which sets the steady state bias on line 60. In general, it was found that the transmission line 60 presents a capacitive input impedance to the modulating signal corresponding to that at input 36 (FIG. 2). This capacitive input is used to perform the second integration corresponding to that performed by integrator 40 (FIG. 2) to achieve the desired parabolic driving waveform generally corresponding to that shown in FIG. 3B. Also, the radar using line 60 had linear frequency modulation wherein the frequency progressively decreased from the beginning to the end of the transmitted pulse.

Line 60 is formed of a number of identical sections. The number of sections is chosen so that the desired overall phase shift can be achieved. The CW signal from oscillator 30 is applied to input 32 (FIGS. 2 and 4) through an input matching transformer 64 which in turn is coupled by a capacitor 66 to a first series inductor 68. Inductor 68 is serially connected between capacitor 66 and a terminal 70. An input resistor 72 is connected at one end to terminal 70 with the other end providing an input 36′, corresponding to input 36 (FIG. 2), for the modulating signal. A semiconductor diode 74 is connected in shunt with the transmission line across terminal 70 and ground. Diode 74 serves as a voltage variable capacitance element in the line. The remaining sections in line 60 are identical to that described above except that the modulating signal is applied to only one section. Sections of line 60 are serially connected in a conventional manner so that the CW signal input at 32 travels progressively through line 60. The output of line 60 is coupled through a capacitor 80 and an output matching transformer 82 to amplifier 43 via connection 42 (FIGS. 2 and 4).

The phase lock circuit 62 has a first input connected at 32 to feed the CW signal from oscillator 30 to a first amplifier 86. Similarly, the output of line 60 developed at transformer 82 (connection 42) is fed to a second amplifier 88. The amplified reference signal and the amplified output signal are fed to a diode ring demodulator 90 which develops an output representative of the steady state phase shift through the delay line 60. The output developed by the demodulator 90 is in turn fed to an active low pass filter 92 which includes an operational amplifier 94. Amplifier 94 also receives a bias reference signal from a potentiometer 95 representing the desired steady state bias for line 60. Amplifier 94 compares the bias reference signal from potentiometer 95 with the input from demodulator 90 and develops a difference signal to correct the bias level on line 60. The bias correction signal from amplifier 94 is applied to the line 60 through an isolating resistor 96. The phase lock or correction signal from amplifier 94 serves to establish a constant steady state phase shift in the line 60 and thus assures that successive FM pulses are initiated with the same relative phase relationship. Amplifier 94 has low pass characteristics such that the bias correction signal is not affected by rapid variations at the output of line 60 while the CW carrier is being modulated by the signal at input 36′.

By way of further illustration, FIG. 6 shows the voltage-capacitance characteristic 98 of the capacitance diode 74. Assuming that a desired operating point 99 is selected, the potentiometer 95 is adjusted so that the bias output from amplifier 94 maintains the steady state reverse bias for all of the diodes at the operating point 99. The operating point is selected so that the capacitance change in each diode follows a square root relationship with the applied voltage. For linearly decreasing frequency modulation of the CW signal, the capacitance at terminal 32 must be progressively increased by the modulating signal applied at input 36. For the polarity of the diodes 74 illustrated in FIG. 4 and the reverse bias applied from amplifier 94, a negatively going ramp is required at terminal 36′. In one embodiment of the present invention diode 74 was selected to have a relatively high Q, for example, a Q of 220 in the VHF region.

FIG. 5 shows one particular circuit for generating the proper input waveform to input 36′ of line 60 (FIG. 4). The circuit of FIG. 5 generally comprises an inverter 104 which receives a timing pulse (via connection 38, FIGS. 2 and 5) from the timing circuit 18 and the inverted pulse output of inverter 104 triggers a multivibrator 106. The multivibrator 106 introduces a fixed delay between receipt of a timing pulse from inverter 104 and the initiation of the generation of the modulating signal to allow circuit components in the system to turn on and stabilize before the actual beginning of each interval of the modulating signal. The output of multivibrator 106 is a negative going pulse with the width of the pulse being determined by the coupling capacitor 110 and a resistor 112. Resistor 112 is preferably adjustable so that the delay may be varied by varying the width of the output pulse from multivibrator 106.

The pulse from multivibrator 106 is fed to a bistable multivibrator 113 which includes two transistors 114, 116. Transistor 116 controls a pair of clamping diodes 118, 120 which in turn control the charging of a capacitor 122. Capacitor 122 is the main timing capacitor for an operational amplifier 124 which functions as a Miller integrator. The output of the Miller integrator (amplifier 124) is a ramp function developed at terminal 126. The direct current level of the ramp output at terminal 126 is shifted by a Zener diode 130 and fed via a potentiometer 131, an emitter follower amplifier 132 and an isolating diode 134 to the input transistor 114 of the bistable multivibrator 113. The negative going ramp developed at terminal 126 is fed through a resistor 140 and a series coupling capacitor 142 to the input 36′ (FIG. 4) through resistor 72 to the delay line 60.

The positive going trailing edge of the pulse from multivibrator 106 triggers multivibrator 113 and a positive gate pulse is developed at transistor 116 to turn off the clamp diodes 118, 120. When diodes 118, 120 are turned off the timing capacitor 122 charges through resistor 123 and a negative going ramp is developed at the output terminal 126 of the operational amplifier 124. When the level of the ramp output at terminal 126 is such that the emitter voltage of amplifier 132 drops below the base voltage of transistor 114, diode 134 conducts and triggers multivibrator 113 to its initial state. With transistor 116 in its initial state, diodes 118, 120 again clamp the timing capacitor C5 to end the generation of the ramp and the output at terminal 126 returns to zero after a short recovery time. This process is repeated each time that inverter 104 receives a timing pulse from the timing circuit 18.

The ramp developed at terminal 126 has a substantially constant slope determined by capacitor 122 and resistor 123. The ramp duration can be varied slightly by means of the potentiometer 131. Since the delay line 60 presents a capacitive input to the ramp, the desired parabolic waveform 52 (FIG. 3B) is achieved by applying the linear ramp to line 60 through resistor 140 which together with the capacitance of line 60 performs the second integration corresponding to that performed by integrator 40 in FIG. 2. Thus, the capacitance of line 60 performs a dual function in that together with resistor 140, the capacitance serves to integrate the linear ramp into the required parabolic waveform corresponding to that illustrated in FIG 3B. However, with respect to the CW signal at input 32, the capacitance of the line varies such that the output at 42 is a linear FM signal. Resistor 140 is preferably adjustable to vary the amplitude of the ramp and this permits the degree of phase modulation to be adjusted.

Although a preferred form of phase shifting circuit has been disclosed as a voltage controlled variable delay line (34, in FIG. 2, line 60 together with the phase lock circuit 62, FIG. 4), it will be understood that other types of phase shift circuits are contemplated to provide the required phase shift at a relatively low frequency. Voltage controlled variable delay lines other than the type of delay line 60 illustrated in FIG. 4 are also contemplated so long as the frequency modulated intermediate carrier developed by the delay line satisfies the following relationship:

$$f_c(t) = \cos[\omega_c t - \theta(t)]$$

where $f_c(t)$ is the output signal at 42, $\theta(t)$ is the output of the second integrator 40 and is defined by the relationship $\theta(t) = \theta_o - kt^2$, the outut of the first integrator 39 (FIG. 2) being $$\omega(t) = \omega_o - \frac{k}{2}t$$

where $k$ is an integration constant from the rectangular pulse waveform $[f(t) = \text{constant}]$ at generator 37.

A lumped constant LC network employing voltage variable diodes 74 as the capacitive elements can be considered to be a section of lossless transmission line, since the attenuation in the passband is zero. The propagation constant $\phi$ is:

$$\phi = \alpha + j\beta\sqrt{(R+j\omega L)(G+j\omega C)}$$

which reduces to:

$$\beta = \omega\sqrt{LC}$$

For the voltage variable semiconductor diode, the capacity is approximately equal to:

$$C = \frac{C_o}{\sqrt{V}} = C_o V^{-1/2}$$

where $C_o$ is the initial capacitance of the diode and V is the applied voltage. The phase shift through N delay line sections is then:

$$N\beta = N\omega\sqrt{LC_o V^{-1/2}}$$

A change in voltage produces a change in phase as follows:

$$N(\beta + \Delta\beta) = N\omega\sqrt{KC_o(V+\Delta V)^{-1/2}} = K\left(1 + \frac{\Delta V}{V}\right)^{-1/4}$$

where $$K = \sqrt{LC_o V^{-1/2}}$$

To produce the linear frequency variation, the phase shift, $N(\beta + \Delta\beta)$, through the network is of the form $a + bt^2$. Therefore, the form of the modulating voltage, $\Delta V$, required to produce linear frequency modulation is:

$$K\left(1 + \frac{\Delta V}{V}\right)^{-1/4} = a + bt^2$$

Assuming that $\Delta V/V$ is small and taking the first two terms of the series expansion of $(1+\Delta V/V)^{-1/4}$, produces the following:

$$K\left(1 - \frac{\Delta V}{4V}\right) = a + bt^2$$

Like coefficients of the above series are equated to give $$a = K$$
$$b = -K/4V$$

and $$\Delta V = t^2$$

The above analysis shows that the desired linear frequency chirp can be generated by applying a parabolic or quadratic modulating waveform to the diodes. Stated broadly, the parabolic modulating waveform matches the voltage-capacitance characteristics of the diodes so as to produce the desired linear FM of the intermediate frequency carrier applied to the delay line. At VHF frequencies, a phase shift of one degree per delay line section can be achieved while maintaining a small ratio, for example, a ratio of 0.1 or less, between the voltage variations ($\Delta V$) and the applied voltage (V).

It will be understood that the linear FM radar and waveform generator which are herein disclosed and described are presented for purposes of explanation and illustration and are not intended to indicate limits of the present invention the scope of which is defined by the following claims.

I claim:

1. A pulse type radar wherein each transmitted pulse has a carrier that is frequency modulated so as to vary progressively from a first frequency at a leading edge of the pulse to a second frequency at the trailing edge of the pulse, said transmitted pulses having a predetermined repetition rate and a first predetermined carrier frequency comprising, a first signal source providing an intermediate carrier signal having a second predetermined frequency substantially below said predetermined transmitted carrier frequency and related to said predetermined transmitted carrier frequency by a predetermined factor, a second signal source providing a modulating signal having repetitive waveform periods each of which is related to the duration of a transmitted pulse and represents said progressive frequency variations during each transmitted pulse, said modulating signal further having a repetition rate related to said transmitted pulse repetition rate, modulating means responsive to said modulating signal to cause progressive frequency deviations in said intermediate carrier frequency during each waveform period, circuit means responsive to said modulated intermediate carrier and operative to increase said intermediate carrier frequency by said factor up to said predetermined transmitted carrier frequency while simultaneously increasing the frequency deviation of said intermediate carrier by said factor and output means responsive to said increased frequency carrier to transmit pulses each of which has said progressive frequency deviation, and wherein said modulating means comprises a voltage-controlled variable delay line having a first input to receive said modulating signal and a second input to receive said intermediate carrier, said delay line having an electrical length which is varied progressively during each waveform period in response to said modulating signal.

2. The radar set forth in claim 1 wherein said delay line comprises a plurality of phase shift sections, each section comprising at least one series inductive impedance means and one shunt capacitive impedance means, said capacitive impedance means comprising a two-terminal semiconductor diode whose capacitance varies as a function of voltage applied across said terminals.

3. The radar set forth in claim 2 wherein said second signal source comprises means for generating a train of rectangular pulses and pulse shaping means responsive to said pulse train and operative to generate a parabolic waveform from each rectangular pulse.

4. The radar set forth in claim 3 wherein said pulse shaping means comprises a first integrator and a second integrator to perform double integration of at least a portion of each of said rectangular pulses.

5. The radar set forth in claim 4 wherein said first integrator develops a linear ramp function output and said second integrator comprises resistive impedance means serially connected between said first integrator and said delay line to couple said ramp output to said line so that said resistive impedance means together with an input capacitance of said line integrates said ramp output.

6. The radar set forth in claim 2 wherein said modulating means further comprises bias means responsive to said unmodulated carrier signal and to an output signal from said delay line to set a steady state bias level for said diodes and thereby establish a predetermined steady state phase shift in said delay line.

7. A pulse type radar comprising a first source of carrier signals having a relatively low frequency, a second source of modulating signals having a repetitive waveform that varies during each waveform period in a manner related to a predetermined frequency deviation in each pulse to be transmitted by said radar, modulating means responsive to said modulating signals to vary the frequency of said carrier signal during each waveform period, circuit means responsive to said modulated carrier to multiply said relatively low frequency up to a relatively high frequency, and means for shaping said high frequency carrier into pulses to be transmitted with each pulse having said predetermined frequency deviations, and wherein said predetermined frequency deviation in each transmitted pulse is a linear variation, said modulating means comprises a voltage controlled delay line having a plurality of series connected phase shift sections, each section having a shunt diode whose capacitance varies substantially as a square root function of voltage applied across said diode, and said modulation signal has a waveform that varies said applied voltage substantially quadratically during each waveform period so as to generate a linear frequency modulated carrier from said delay line.

8. A pulse type radar wherein each transmitted pulse has a carrier that is frequency modulated according to a predetermined periodic variation between leading and trailing edges of each transmitted pulse, said transmitted pulses having a predetermined repetition rate and a first predetermined carrier frequency, comprising a first signal source providing an intermediate frequency carrier having a second predetermined frequency substantially below said first predetermined carrier frequency, a second signal source providing a modulating signal having repetitive waveform periods each of which is related to the duration of a transmitted pulse and represents said predetermined periodic variation during each transmitted pulse, said modulating signal further having a repetition rate related to said transmitted pulse repetition rate, a voltage-controlled variable delay line having a first input coupled to said first signal source to apply said intermediate carrier thereto and a second input coupled to said second signal source to apply the modulating signal thereto so as to vary the electrical length of said delay line during each waveform period of said modulating signal and to thereby frequency modulate said intermediate carrier, frequency multiplication means operatively coupled to said delay line to increase the frequency of said modulated intermediate carrier up to said predetermined transmitted carrier frequency, and output means operatively coupled to said frequency multiplication means and responsive to said increased frequency carrier to transmit pulses each of which has said predetermined periodic variation.

References Cited
UNITED STATES PATENTS

| | | | |
|---|---|---|---|
| 2,624,876 | 1/1953 | Dicke | 343—13 |
| 3,140,489 | 7/1964 | Downie | 343—17.2 |
| 3,144,623 | 8/1964 | Steiner | 343—17.2 X |
| 3,178,712 | 4/1965 | Fritzgerald et al. | 343—101 |

RODNEY D. BENNETT, *Primary Examiner.*

J. P. MORRIS, *Assistant Examiner.*